United States Patent
Cho et al.

(10) Patent No.: US 11,515,524 B2
(45) Date of Patent: Nov. 29, 2022

(54) POSITIVE ACTIVE MATERIAL FOR RECHARGEABLE LITHIUM BATTERY AND RECHARGEABLE LITHIUM BATTERY INCLUDING SAME

(71) Applicant: Samsung SDI Co., Ltd., Yongin-si (KR)

(72) Inventors: Yongmok Cho, Yongin-si (KR);
Young-Hun Lee, Yongin-si (KR);
Hyunjei Chung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/243,594

(22) Filed: Jan. 9, 2019

(65) Prior Publication Data
US 2019/0214639 A1  Jul. 11, 2019

(30) Foreign Application Priority Data

Jan. 10, 2018 (KR) .................. 10-2018-0003396

(51) Int. Cl.
*H01M 4/36* (2006.01)
*H01M 4/525* (2010.01)
(Continued)

(52) U.S. Cl.
CPC .......... *H01M 4/366* (2013.01); *H01M 4/483* (2013.01); *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2005/0147892 A1  7/2005 Nishida et al.
2008/0138708 A1  6/2008 Watanabe et al.
(Continued)

FOREIGN PATENT DOCUMENTS

CN  101192668 A    6/2008
CN  103000880 A *  3/2013  ........ H01M 10/0525
(Continued)

OTHER PUBLICATIONS

Fey et al. ("Nanoparticulate coatings for enhanced cyclability of LiCoO2 cathodes", Journal of Power Sources, 146 (2005), 65-70).*
(Continued)

*Primary Examiner* — Ula C Ruddock
*Assistant Examiner* — Tony S Chuo
(74) *Attorney, Agent, or Firm* — Lewis Roca Rothgerber Christie LLP

(57) ABSTRACT

A positive active material for a rechargeable lithium battery includes: a core having a layered structure; and a surface layer on at least one portion of the surface of the core and including an oxide, wherein the oxide includes at least one first element and at least one second element each selected from Ti, Zr, F, Mg, Al, P, and a combination thereof, the first element and the second element being different from one another, the first element included in the positive active material in an amount of about 0.01 mol % to about 0.2 mol % based on a total weight of the positive active material, and the second element included in the positive active material in an amount of about 0.02 mol % to about 0.5 mol % based on a total weight of the positive active material. A rechargeable lithium battery includes the positive active material.

11 Claims, 2 Drawing Sheets

(51) Int. Cl.
H01M 10/0525 (2010.01)
H01M 4/48 (2010.01)
H01M 4/02 (2006.01)

(56) References Cited

U.S. PATENT DOCUMENTS

| | | | |
|---|---|---|---|
| 2013/0183579 A1 | 7/2013 | Kim et al. | |
| 2015/0147651 A1 | 5/2015 | Hong et al. | |
| 2015/0380722 A1 | 12/2015 | Blangero et al. | |
| 2016/0028082 A1* | 1/2016 | Choi .................. | H01M 10/052 429/223 |
| 2017/0222211 A1 | 8/2017 | Ryu et al. | |
| 2017/0346070 A1 | 11/2017 | Kim et al. | |

FOREIGN PATENT DOCUMENTS

| | | |
|---|---|---|
| CN | 103208623 A | 7/2013 |
| CN | 104681818 A | 6/2015 |
| CN | 107437610 A | 12/2017 |
| JP | 2008-181714 A | 8/2008 |
| JP | 4651279 B2 | 12/2010 |
| JP | 5678826 B2 | 1/2015 |
| KR | 10-2015-0090215 A | 8/2015 |
| KR | 10-2016-0040116 A | 4/2016 |

OTHER PUBLICATIONS

Shim et al. ("Effects of MgO Coating on the Structural and Electrochemical Characteristics of LiCoO2 as Cathode Materials for Lithium Ion Battery", Chemistry of Materials, 2014, 26, 2537-2543).*

Office Action, including English Translation, for Corresponding Chinese Patent Application No. 201910022398.1, dated Aug. 5, 2021 (17 pages).

George Ting-Kuo Fey, et al., "Nanoparticulate coatings for enhanced cyclability of LiCoO2 cathodes", Journal of Power sources, vol. 146, May 31, 2002, pp. 65-70.

Jae-Hyun Shim, et al., "Effects of MgO Coating on the Structural and Electrochemical Characteristics of LiCoO2 as Cathode Materials for Lithium Ion Battery", Chemistry of Materials, Mar. 31, 2014, pp. 2537-2543.

Decision of Rejection dated Jun. 6, 2022, of the corresponding Chinese Patent Application No. 201910022398.1, including English translation 17pp.

Notice of Allowance dated Sep. 30, 2022, of the corresponding Chinese Patent Application No. 201910022398.1, including a search report dated Sep. 22, 2022, including Eng. translation 7pp.

* cited by examiner

POSITIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2018-0003396, filed in the Korean Intellectual Property Office on Jan. 10, 2018, the entire contents of which are incorporated herein by reference.

BACKGROUND

1. Field

Embodiments of the present disclosure relate to a positive active material for a rechargeable lithium battery and a rechargeable lithium battery including the same.

2. Description of the Related Art

Recently, electronic devices have been developed to have a smaller size and a lighter weight as a result of changes in the high-tech electronic industry, so portable electronic devices are becoming more prevalent. As a power source for the portable electronic device, a rechargeable lithium battery having a long cycle-life and a high energy density has been widely used.

Elements of a rechargeable lithium battery include a positive electrode including a positive active material, a negative electrode including a negative active material, an electrolyte, a separator, and the like.

Recently, the usage of rechargeable lithium batteries is expanding from portable electronic devices to industry fields such as power tools and vehicles, so there has been active research in developing a rechargeable lithium battery having a high capacity. Specifically, in order to ensure that the rechargeable lithium battery has an excellent cycle-life and storage characteristics even under high temperature and high voltage atmosphere, various researches on improving performance of the positive active material, which is one of the elements of the rechargeable lithium battery, have been performed.

SUMMARY

Embodiments of the present disclosure provide a positive active material for a rechargeable lithium battery capable of realizing a high voltage and improving resistance characteristics and storage characteristics, and a rechargeable lithium battery including the same.

In one aspect of an embodiment, the present disclosure provides a positive active material for a rechargeable lithium battery, the positive active material including a core having a layered structure and a surface layer on at least one portion of the surface of the core and including an oxide, wherein the oxide includes at least one first element and at least one second element each selected from the group consisting of Ti, Zr, F, Mg, Al, P, and a combination thereof, the first element and the second element being different from one another, the first element is included in the positive active material in an amount of about 0.01 mol % to about 0.2 mol % based on a total weight of the positive active material for a rechargeable lithium battery, and the second element is included in the positive active material in an amount of about 0.02 mol % to about 0.5 mol % based on a total weight of the positive active material for a rechargeable lithium battery.

In another aspect of an embodiment, a rechargeable lithium battery includes a positive electrode, a negative electrode, and an electrolyte solution, wherein the positive electrode includes the positive active material for a rechargeable lithium battery according to an embodiment.

The positive active material for a rechargeable lithium battery according to an embodiment of the present disclosure may realize a high voltage due to a remarkable decrease of a surface resistance, and when it is applied to a rechargeable lithium battery, a rechargeable lithium battery having improved high temperature long-term characteristics may be realized.

In addition, when the positive active material for a rechargeable lithium battery according to embodiments of the present disclosure is applied for a rechargeable lithium battery, it may further improve storage characteristics and cycle-life characteristics.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
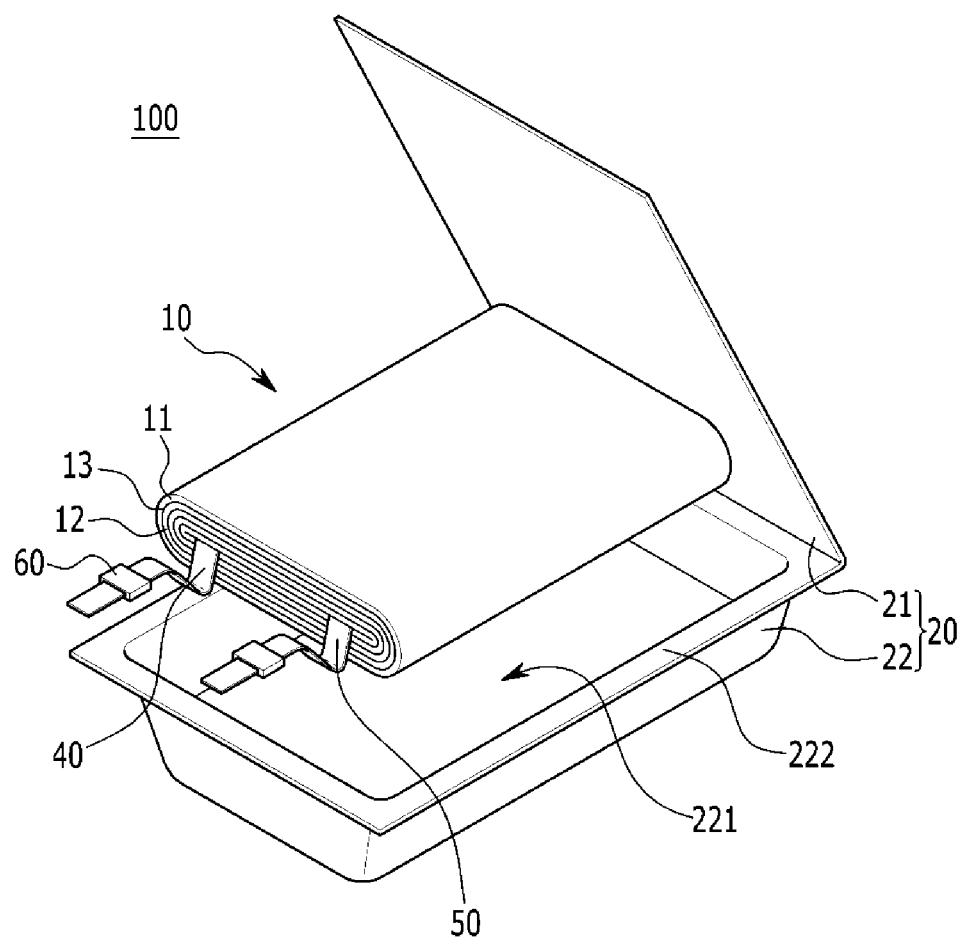
FIG. 1 is a schematic view showing a structure of a rechargeable lithium battery according to an embodiment of this disclosure.

The subject matter of the present disclosure will be described more fully hereinafter with reference to the accompanying drawings, in which embodiments of the present disclosure are shown. The subject matter of the present disclosure may be modified in various different ways, all without departing from the spirit or scope of the present disclosure.

In the drawings, parts having no relationship with the description are omitted for clarity of the described embodiments, and the same or similar constituent elements are indicated by the same reference numerals throughout the specification.

The size and thickness of each constituent element as shown in the drawings may be arbitrarily shown for better understanding and ease of description, and this disclosure is not necessarily limited to the sizes and thicknesses as shown.

In addition, unless explicitly described to the contrary, the word "comprise" and variations such as "comprises" or "comprising", will be understood to imply the inclusion of stated elements but not the exclusion of any other elements.

As used herein, "to" refers to an upper limit value and a lower limit. For example, about 1 to about 10 refers to a range of greater than or equal to about 1 and less than or equal to about 10.

A positive active material for a rechargeable lithium battery according to an embodiment of the present disclosure includes a core having a layered structure and a surface layer on at least one part (or portion) of the surface of the core and including an oxide.

First, the core having the layered structure may include, for example, a lithium cobalt-based oxide particle. In some embodiments, the core having the layered structure may be represented by Chemical Formula 1.

$$Li_{1\pm x1}Co_{1-x2-x3}M1_{x2}M2_{x3}O_2 \quad \text{Chemical Formula 1}$$

In Chemical Formula 1, $0<x1<0.05$, $0.005 \le x2 \le 0.02$, $0.005 \le x3 \le 0.025$, M1 includes one selected from Mg, Al, Co, Ni, K, Na, Ca, Si, Fe, Cu, Zn, Ti, Sn, V, Ge, Ga, B, P, Se, Bi, As, Zr, Mn, Cr, Sr, Sc, Y, and a combination thereof, and M2 includes one selected from Al, Mg, Co, Ni, K, Na, Ca, Si, Fe, Cu, Zn, Ti, Sn, V, Ge, Ga, B, P, Se, Bi, As, Zr, Mn, Cr, Sr, Sc, Y, and a combination thereof.

In some embodiments, the lithium cobalt-based oxide, for example, $LiCoO_2$, has an R-3m rhombohedral layered structure. For example, $LiCoO_2$ may have a structure in which lithium, cobalt, and oxygen are regularly arranged in O—Li—O—Co—O—Li—O—Co—O along the [111] crystal plane of a rock salt structure, which is referred to as a O3 type layered structure.

When the positive active material including the lithium cobalt-based oxide is utilized in a rechargeable lithium battery, and the rechargeable lithium battery is charged, lithium ions are deintercalated from a crystal lattice of the lithium cobalt-based oxide to the outside of the lattice.

But, in a lithium cobalt-based oxide that does not include the M1 and M2 elements of the present disclosure, as a charge voltage is increased, the lithium ion amount deintercalated from the crystal lattice of the lithium cobalt-based oxide is also increased, so at least a part of the O3 type layered structure may be phase-transitioned into an O1 type layered structure (O1 phase) in which Li is not present in the crystal lattice. Consequently, when the charge voltage is greater than or equal to about 4.52 V (with reference to a full cell), the lithium cobalt-based oxide may be phase-transitioned into an H1-3 type layered structure (H1-3 phase) in which both the O3 type layered structure and the O1 type layered structure exist in the crystal lattice of the lithium cobalt-based oxide.

As described above, the phase transition from the O3 type layered structure to the H1-3 type layered structure and the O1 type layered structure is at least partially irreversible, and the amount of lithium ions that may be intercalated/deintercalated are decreased in the H1-3 type layered structure and the O1 type layered structure. Thus, this phase transition does not help mitigate the rapid deterioration of the storage and cycle-life characteristics of the rechargeable lithium battery and the like.

However, as described above, in embodiments of the present disclosure the cobalt site of the lithium cobalt-based oxide particle is doped with at least two kinds of elements such as M1 and M2, within each range of x2 and x3, thereby improving structural stability of the crystalline structure of the lithium cobalt-based oxide particle even under a high temperature and a high voltage atmosphere, and thus, a positive active material having improved cycle-life and storage characteristics may be realized.

In some embodiments, in Chemical Formula 1, x2 and x3 may satisfy the range of Formula 1. When each content of M1 and M2 doped in the cobalt site of the oxide particle having the layered structure satisfies Formula 1, a rechargeable lithium battery having excellent cycle-life and storage characteristics may be realized.

$$0.01 \le x2 \le 0.015$$

$$0.01 \le x3 \le 0.02 \quad \text{Formula 1}$$

In addition, in Chemical Formula 1, x2 and x3 may satisfy the range of Formula 2. When each content of M1 and M2 doped in the cobalt site of the oxide particle having the layered structure satisfies Formula 2, a rechargeable lithium battery having excellent resistance and storage characteristics may be realized.

$$0.02 \le x2+x3 \le 0.03 \quad \text{Formula 2}$$

In Chemical Formula 1, x2 and x3 may satisfy the range of Formula 3. When each content of M1 and M2 doped in the cobalt site of the oxide particle having the layered structure satisfies Formula 3, a rechargeable lithium battery having excellent cycle-life and storage characteristics may be realized.

$$0.3 \le x2/x3 \le 1.0 \quad \text{Formula 3}$$

In Chemical Formula 1 representing the oxide particle having the layered structure in the positive active material according to an embodiment of the present disclosure, M1 may include Mg and M2 may include Al. When the cobalt site of the lithium cobalt-based oxide particle is doped with Mg satisfying the content range of x2 and Al satisfying the content range of x3, the cobalt site of the lithium cobalt-based oxide is substituted with Mg or Al, and thus, the structural stability of the crystal structure of the lithium cobalt-based oxide particle may be further improved. In this way, as the structural stability of the positive active material may be improved, a rechargeable lithium battery having improved safety in a high voltage and high temperature environment may be realized.

In the present embodiment, the compound represented by Chemical Formula 1 may include at least one selected from $Li_{1.025}Co_{0.9773}Mg_{0.01}Al_{0.0127}O_2$, $Li_{1.02}Co_{0.9773}Mg_{0.01}Al_{0.0127}O_2$, and $Li_{1.03}Co_{0.9773}Mg_{0.01}Al_{0.0127}O_2$.

Then, a surface layer is present in a part of the oxide particle having the layered structure.

The surface layer includes a compound (e.g., an oxide), and the oxide may include at least one first element and at least one second element, the first element and the second element each being selected from Ti, Zr, F, Mg, Al, P, and a combination thereof.

Herein, the first element and the second element are different each other. For example, the first element may include Zr, and the second element may include Ti.

As aforementioned, when the at least one first element and at least one second element which are different from each other are included on at least one part of the surface of the core in which the cobalt site is substituted, sheet resistance of the positive active material may be sharply reduced. For example, referring to electrochemical impedance spectroscopy (EIS) results (FIG. 2) of rechargeable lithium battery cells according to some Examples and Comparative Examples which are described herein below, resistances (e.g., sheet resistances) of the Examples are sharply reduced as compared with those of the Comparative Examples, and accordingly, sheet resistances of the positive active materials according to the Examples are considered to be improved as compared to the Comparative Examples. Accordingly, resistance characteristics and storage characteristics of the positive active material according to an embodiment may be remarkably improved.

In some embodiments, the first element may be included in the positive active material in an amount of about 0.01 mol % to about 0.2 mol %, or, for example, about 0.025 mol % to about 0.1 mol % based on a total weight, for example, total mole number of the positive active material for a rechargeable lithium battery. For example, the first element may be included in the positive active material in an amount of about 0.01 mol % to about 0.2 mol % based on 100 mol % of the positive active material. In addition, the second element may be included in the positive active material in an amount of about 0.02 mol % to about 0.5 mol %, or, for example, about 0.1 mol % to about 0.3 mol % based on a total weight of the positive active material for a rechargeable lithium battery. When the first element and the second element respectively satisfy the ranges described herein, surface resistance (e.g., sheet resistance) of the positive active material may be reduced. Herein, a ratio of the mol % of the second element relative to the mol % of the first element (second element/first element) may be about 1 to about 10. When the mol % of the second element relative to the mol % of the first element respectively satisfy the ranges described herein, an effect of reducing the sheet resistance of the positive active material may be much improved.

In some embodiments, the oxide may further include at least one third element selected from Ti, Zr, F, Mg, Al, P, and a combination thereof.

In some embodiments, the third element may include Mg. When the third element is included in the surface layer, an effect of reducing surface resistance (e.g., sheet resistance) of the positive active material may be much improved.

In the present embodiment, the surface layer may be present as a layer shape or an island shape having a set or predetermined thickness on the surface of the oxide core particle.

In addition, the elements doped in the oxide core having the layered structure may be transferred during the manufacturing process, and thus, may be included in a part (or portion) of the surface layer.

A rechargeable lithium battery according to an embodiment of the present disclosure includes a positive electrode, a negative electrode and an electrolyte solution.

Hereinafter, a rechargeable lithium battery according to an embodiment is described with reference to FIG. 1.

FIG. 1 is a schematic view showing a structure of a rechargeable lithium battery according to an embodiment of this disclosure.

Referring to FIG. 1, a rechargeable lithium battery 100 according to an embodiment of this disclosure includes an electrode assembly 10, an exterior material 20 housing the electrode assembly 10, and a positive terminal 40 and a negative electrode terminal 50 electrically coupled to (e.g., electrically connected to) the electrode assembly 10.

The electrode assembly 10 may include a positive electrode 11, a negative electrode 12, a separator 13 between the positive electrode 11 and the negative electrode 12, and an electrolyte solution impregnating the positive electrode 11, the negative electrode 12, and the separator 13.

In embodiments of the present disclosure, the positive electrode 11 may be the positive electrode including a positive active material for a rechargeable lithium battery described above.

In some embodiments, the positive electrode 11 includes a positive active material layer on a positive current collector. The positive active material layer includes a positive active material, and the positive active material may include the positive active material for a rechargeable lithium battery according to embodiments of the present disclosure.

In embodiments of the positive active material layer, an amount of the positive active material may be about 90 wt % to about 98 wt % based on the total weight of the positive active material layer.

In an embodiment, the positive active material layer may further include a binder and a conductive material. Herein, each content of the binder and the conductive material may be about 1 wt % to about 5 wt % based on the total weight of the positive active material layer.

The binder improves binding properties of positive active material particles with one another and with a current collector. Examples of the binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity. Any suitable electrically conductive material may be used as a conductive material unless it causes a chemical change (e.g., an undesirable chemical change in the rechargeable lithium battery). Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative and the like; or a mixture thereof.

The positive current collector may include an aluminum foil, a nickel foil, or a combination thereof, but is not limited thereto.

The negative electrode 12 includes a negative current collector and a negative active material layer on the current collector. The negative active material layer includes a negative active material.

The negative active material includes a material that reversibly intercalates/deintercalates lithium ions, a lithium metal, a lithium metal alloy, a material being capable of doping/dedoping lithium, and/or a transition metal oxide.

The material that reversibly intercalates/deintercalates lithium ions includes a carbon material. The carbon material may include any suitable, generally-used carbon-based negative active material in a rechargeable lithium battery. Examples of the carbon-based negative active material may include crystalline carbon, amorphous carbon, or mixtures thereof. The crystalline carbon may be non-shaped (e.g., undefined shape), or sheet, flake, spherical, or fiber shaped natural graphite or artificial graphite.

The amorphous carbon may include a soft carbon, a hard carbon, a mesophase pitch carbonization product, fired coke, and/or the like.

The lithium metal alloy includes an alloy of lithium and a metal or semi-metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include a silicon-based material, for example, Si, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), a Si-carbon composite, Sn, $SnO_2$, Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and not Sn), a Sn-carbon composite and/or the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may include lithium titanium oxide.

In the negative active material layer, the negative active material may be included in an amount of about 95 wt % to about 99 wt % based on the total weight of the negative active material layer.

The negative active material layer includes a negative active material and a binder, and, optionally, a conductive material. In the negative active material layer, a content of the binder may be about 1 wt % to about 5 wt % based on the total weight of the negative active material layer. In some embodiments, when the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. The binder may include a non-water-soluble binder, a water-soluble binder, or a combination thereof.

The non-water-soluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include a styrene-butadiene rubber, an acrylated styrene-butadiene rubber, a polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity as a thickener. The cellulose-based compound includes one or more of carboxylmethyl cellulose, hydroxypropylmethyl cellulose, methyl cellulose, or alkali metal salts thereof. The alkali metals may be Na, K, or Li. The thickener may be included in an amount of about 0.1 parts by weight to about 3 parts by weight based on 100 parts by weight of the negative active material.

The conductive material is included to provide electrode conductivity. Any suitable electrically conductive material may be used as a conductive material unless it causes a chemical change (e.g., an undesirable chemical change in the rechargeable lithium battery). Examples of the conductive material include a carbon-based material such as natural graphite, artificial graphite, carbon black, acetylene black, ketjen black, denka black, carbon fiber, and the like; a metal-based material of a metal powder or a metal fiber including copper, nickel, aluminum silver, and the like; a conductive polymer such as a polyphenylene derivative; or a mixture thereof.

The negative current collector may include one selected from a copper foil, a nickel foil, a stainless steel foil, a titanium foil, a nickel foam, a copper foam, a polymer substrate coated with a conductive metal, and a combination thereof.

In some embodiments, the electrode assembly 10, as shown in FIG. 1, may have a structure obtained by interposing a separator 13 between band-shaped positive electrode 11 and negative electrode 12, spirally winding them, and compressing it to be flat. In some embodiments, a plurality of quadrangular sheet-shaped positive and negative electrodes may be alternately stacked with a plurality of separators therebetween.

In addition, an electrolyte solution may be impregnated in the positive electrode 11, the negative electrode 12, and the separator 13.

The separator 13 may be any suitable, generally-used separator in a lithium battery which can separate a positive electrode 11 and a negative electrode 12 and provide a transporting passage for lithium ions. For example, the separator may have low resistance to ion transport and excellent impregnation for an electrolyte. The separator 13 may be, for example, selected from a glass fiber, polyester, polyethylene, polypropylene, polytetrafluoroethylene, or a combination thereof. It may have a form of a non-woven fabric or a woven fabric. For example, in a rechargeable lithium battery, a polyolefin-based polymer separator such as polyethylene and polypropylene may be used. In order to ensure the heat resistance or mechanical strength, a coated separator including a ceramic component or a polymer material may be used. Optionally, the separator may have a mono-layered or multi-layered structure.

The electrolyte solution includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like, and the ester-based solvent may include methyl acetate, ethyl acetate, n-propyl acetate, dimethylacetate, methyl propionate, ethyl propionate, propyl propionate, γ-butyrolactone, decanolide, valerolactone, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like and the ketone-based solvent may include cyclohexanone, and/or the like. The alcohol based solvent may include ethanol, isopropyl alcohol, and/or the like, and the aprotic solvent may include nitriles such as R—CN (wherein R is a C2 to C20 linear, branched, or cyclic hydrocarbon group, or may include a double bond, an aromatic ring, or an ether bond), and/or the like, amides such as dimethyl formamide, and/or the like, dioxolanes such as 1,3-dioxolane, and/or the like, sulfolanes, and/or the like.

The non-aqueous organic solvent may be used alone or in a mixture. When the organic solvent is used in a mixture, the mixture ratio may be controlled in accordance with a suitable or desirable battery performance.

The carbonate-based solvent may include a mixture of a cyclic carbonate and a linear (chain) carbonate. When the cyclic carbonate and the linear carbonate are mixed together to a volume ratio of about 1:1 to about 1:9, electrolyte performance may be improved.

The non-aqueous organic solvent of this disclosure may further include an aromatic hydrocarbon-based organic solvent in addition to the carbonate-based solvent. Herein, the carbonate-based solvent and the aromatic hydrocarbon-based organic solvent may be mixed to a volume ratio of about 1:1 to about 30:1.

The aromatic hydrocarbon-based organic solvent may be an aromatic hydrocarbon-based compound of Chemical Formula 3.

Chemical Formula 3

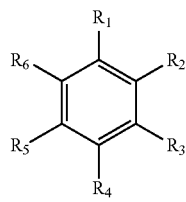

In Chemical Formula 3, $R_1$ to $R_6$ are the same or different and are selected from hydrogen, a halogen, a C1 to C10 alkyl group, a haloalkyl group, and a combination thereof.

Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof. As used herein, the terms "combination thereof" and "combinations thereof" may refer to a chemical combination (e.g., an alloy or chemical compound), a mixture, or a laminated structure of components.

The non-aqueous electrolyte may further include vinylene carbonate or an ethylene carbonate-based compound of Chemical Formula 4 in order to improve cycle life of a battery.

Chemical Formula 4

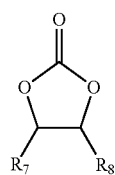

In Chemical Formula 4, $R_7$ and $R_8$ are the same or different and selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and fluorinated C1 to C5 alkyl group, and $R_7$ and $R_8$ are not simultaneously hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive for improving cycle life may be used within a suitable or appropriate range.

The lithium salt is dissolved in an organic solvent, supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein, x and y are natural numbers, for example an integer in a range of 1 to 20, LiCl, LiI, and $LiB(C_2O_4)_2$ (lithium bis(oxalato) borate; LiBOB). The lithium salt may be used in a concentration in a range of about 0.1 M to about 2.0 M. When the lithium salt is included at the above concentration range, an electrolyte may have excellent performance and lithium ion mobility due to optimal electrolyte conductivity and viscosity.

The separator 13 between the positive electrode 11 and the negative electrode 12 may include a polymer film. The separator may include for example, polyethylene, polypropylene, polyvinylidene fluoride, and/or multi-layers thereof such as a polyethylene/polypropylene double-layered separator, a polyethylene/polypropylene/polyethylene triple-layered separator, and/or a polypropylene/polyethylene/polypropylene triple-layered separator.

The exterior material 20 may include (e.g., consist of) a lower exterior material 22 and an upper exterior material 21, and the electrode assembly 10 is housed in an internal space 221 of the lower exterior material 22.

After housing the electrode assembly 10 in the exterior material 20, a sealant is applied at a sealing region 222 along the edge of the lower exterior material 22 to seal the upper exterior material 21 and the lower exterior material 22. Herein, parts where the positive terminal 40 and the negative electrode terminal 50 are in contact with the exterior material 20 may be wrapped with an insulation member 60 to improve durability of the rechargeable lithium battery 100.

The upper limit of working voltage of the rechargeable lithium battery according to the present embodiment may be in a range of, for example, from about 4.3 V to about 4.6V, or, for example, about 4.4 V to about 4.6 V. In the present specification, the working voltage of the rechargeable lithium battery is based on the coin-type (shaped) half-cell.

As described above, embodiments of the present disclosure may realize a rechargeable lithium battery having excellent storage characteristics and cycle-life characteristics and concurrently (e.g., simultaneously) having high output and energy density due to the positive active material according to an embodiment, even if driving the rechargeable lithium battery under a high-voltage atmosphere.

Meanwhile, the rechargeable lithium battery according to an embodiment may be included in a device. Such a device may include for example, one of a mobile phone, a tablet computer, a laptop computer, a power tool, a wearable electronic device, an electric vehicle, a hybrid electric vehicle, a plug-in hybrid electric vehicle, and a power storage device. In this way, the rechargeable lithium battery can be applied to any suitable device, and thus, further description of the device is not necessary here.

Hereinafter, embodiments of the present disclosure will be described with respect to Examples, but the present disclosure is not limited thereto.

Example 1

(1) Manufacture of Positive Electrode

Lithium carbonate, cobalt oxide, $MgCO_3$, and $Al_2O_3$ were mixed to a mole ratio of Li:Co:Mg:Al=1.025:0.98:0.01: 0.0127.

The mixture was primarily heat-treated at 1085° C. under an air atmosphere for 15 hours to prepare oxide particles having a layered structure of $Li_{1.025}Co_{0.9773}Mg_{0.01}Al_{0.0127}O_2$ and an average particle diameter (D50) of about 17 μm.

The oxide particles, $Co_3O_4$, $Li_2Co_3$, and $ZrO_2$, and $TiO_2$ as coating materials were mixed and secondarily heat-treated at 900° C. under an air atmosphere for 15 hours to prepare a positive active material. The positive active material included the large-sized $Li_{1.025}Co_{0.9773}Mg_{0.01}Al_{0.0127}O_2$ particle of an average particle diameter (D50) of about 15 μm, having a layered structure and having a surface layer including $ZrO_2$ and $TiO_2$ and the small-sized $Li_{1.025}Co_{0.9773}Mg_{0.01}Al_{0.0127}O_2$ particle of an average particle diameter (D50) of about 4.5 μm, having a layered structure and having a surface layer including $ZrO_2$ and $TiO_2$. Herein, each amount of the materials was adjusted to have the number of moles of Zr and Ti based on 1 mole of the positive active material included in the positive active material and their mole ratio (ratio of Ti to Zr) as shown in Table 1. Herein, the surface layer was present as an island on the surface of the oxide particles.

The positive active material of 96 wt %, a carbon black conductive material of 2 wt % and a polyvinylidene fluoride binder of 2 wt % were mixed in an N-methyl pyrrolidone solvent to prepare a positive active material slurry. The slurry was coated on an Al foil, dried and pressed to fabricate a positive electrode.

(2) Manufacture of Half-Cell

Using the positive electrode obtained from (1), a lithium metal counter electrode, and an electrolyte solution, a coin-shaped half-cell was manufactured according to a generally-used method. The electrolyte solution was obtained by dissolving 1.15 M of $LiPF_6$ in a mixed solvent of ethylene carbonate, propylene carbonate, ethyl propionate, and propyl pionate (volume ratio of 15:15:25:45). The specific capacity of the fabricated coin-shaped half-cell was measured. The result is the specific capacity of 190 mAh/g.

Examples 2 to 13 and Comparative Examples 1 to 13

Each positive electrode and each coin-shaped half-cell were manufactured according to substantially the same method as Example 1 except that a coating process for forming a surface layer was performed by dry-mixing $ZrO_2$ and $TiO_2$ as coating materials to have a mole ratio of Ti to Zr as shown in Table 1.

Experimental Example 1: Initial Charge Amount, Discharge Amount, and Measurement Formation processes of the coin-shaped half-cells according to Examples 1 to 13 and Comparative Examples 1 to 13 were performed by once charging and discharging them at 0.2 C in a range of 3.0 V to 4.55 V. Herein, charge and discharge capacity and efficiency of the cells were calculated, and the results are shown in Table 1.

In addition, after the formation processes, the coin-shaped half-cells were once charged and discharged at 1.0 C in a range of 3.0 V to 4.58 V, and then, 1.0 C/0.2 C ratios of the cells were calculated and shown in Table 1.

Experimental Example 2: Measurement of DC Internal Resistance (Direct Current, Internal Resistance: DC-IR)

DC internal resistance (DC-IR) of the coin-shaped half-cells according to Examples 1 to 13 and Comparative Examples 1 to 13 was measured in the following method.

The coin-shaped half-cells were charged up to 4.55 V at a current of 0.2 C with a constant current-constant voltage (CC-CV) under a cut-off condition of 0.05 C at the 1$^{st}$ cycle. SOC (state of charge): 100% (full charge)

Subsequently, the coin-shaped half-cells were discharged at 0.2 C down to SOC of 70% with a constant current (CC) and then, cut-off at a time of 0.2 C (which refers to the time required for reaching 70% of capacity under 0.2 C constant current (CC) charging). Then, the coin-shaped half-cells were discharged at 2 C in SOC of 70% for 1 second with a constant current (CC), and dV of the cells at 0.2 C and 2 C was calculated to obtain DC-IR. The results are shown in Table 1.

TABLE 1

| | | | | Formation process | | | | |
| --- | --- | --- | --- | --- | --- | --- | --- | --- |
| | Ti (mole) | Zr (mole) | Ti/Zr | 0.2 C charge capacity (mAh/g) | 0.2 C discharge capacity (mAh/g) | Efficiency (%) | 1.0 C/ 0.2 C (%) | DC-IR [@SOC 70] |
| Example 1 | 0.0002 | 0.00010 | 2 | 212 | 201.1 | 94.9 | 95.1 | 18.5 |
| Example 2 | 0.002 | 0.00025 | 8 | 211 | 201 | 95.3 | 95.4 | 15.8 |
| Example 3 | 0.001 | 0.00050 | 2 | 211 | 200.9 | 95.2 | 95.3 | 14.2 |
| Example 4 | 0.002 | 0.00075 | 2.7 | 210 | 200.1 | 95.3 | 95.6 | 14.5 |
| Example 5 | 0.002 | 0.001 | 2 | 209 | 199.2 | 95.3 | 95.5 | 15.1 |
| Example 6 | 0.002 | 0.00150 | 1.3 | 207 | 195.7 | 94.5 | 95.1 | 17.2 |
| Example 7 | 0.002 | 0.00200 | 1 | 203 | 191.8 | 94.5 | 94.9 | 18.9 |
| Example 8 | 0.0005 | 0.0005 | 1 | 207.8 | 197.5 | 95.0 | 95.0 | 20.1 |
| Example 9 | 0.001 | 0.0005 | 2 | 208 | 197.6 | 95.0 | 95.0 | 15.8 |
| Example 10 | 0.002 | 0.0005 | 4 | 211 | 200.9 | 95.2 | 95.3 | 14.2 |
| Example 11 | 0.003 | 0.0005 | 6 | 208 | 197.0 | 94.7 | 94.5 | 14.5 |
| Example 12 | 0.005 | 0.0005 | 10 | 206.8 | 195.2 | 94.4 | 94.3 | 16.8 |
| Example 13 | 0.002 | 0.0003 | 6.7 | 211 | 201 | 95.3 | 95.4 | 15.8 |
| Comparative Example 1 | 0.000 | 0.0000 | — | 210 | 200 | 95.2 | 95.4 | 35.6 |

TABLE 1-continued

|  | Ti (mole) | Zr (mole) | Ti/Zr | Formation process | | | 1.0 C/ 0.2 C (%) | DC-IR [@SOC 70] |
|---|---|---|---|---|---|---|---|---|
|  |  |  |  | 0.2 C charge capacity (mAh/g) | 0.2 C discharge capacity (mAh/g) | Efficiency (%) |  |  |
| Comparative Example 2 | 0.002 | 0.0000 | — | 212 | 201.6 | 95.1 | 94.9 | 27.2 |
| Comparative Example 3 | 0.002 | 0.0025 | 0.8 | 201 | 189.2 | 94.1 | 94.5 | 25.7 |
| Comparative Example 4 | 0 | 0.0005 | — | 208 | 197.6 | 95.0 | 95.0 | 22.4 |
| Comparative Example 5 | 0.007 | 0.0005 | 14 | 203.2 | 191.9 | 94.4 | 94.0 | 21.8 |
| Comparative Example 6 | 0.001 | 0 | — | 212 | 201.6 | 95.1 | 95.4 | 22.5 |
| Comparative Example 7 | 0.003 | 0 | — | 214 | 204.6 | 95.6 | 95.1 | 20.5 |
| Comparative Example 8 | 0.005 | 0 | — | 214 | 203.8 | 95.2 | 94.9 | 21 |
| Comparative Example 9 | 0 | 0.0001 | — | 210 | 199.7 | 95.1 | 94.5 | 33.5 |
| Comparative Example 10 | 0 | 0.00025 | — | 209 | 198.6 | 95 | 94.8 | 30.8 |
| Comparative Example 11 | 0 | 0.001 | — | 205 | 195 | 95.1 | 95.6 | 24.8 |
| Comparative Example 12 | 0 | 0.0015 | — | 203.2 | 191.2 | 94.1 | 93.5 | 32 |
| Comparative Example 13 | 0 | 0.002 | — | 201.8 | 190 | 94.2 | 92 | 34 |

Referring to Table 1, the coin-shaped half-cells according to Examples 1 to 13 showed a high 1.0 C/0.2 C ratio and overall low DC-IR compared with the coin-shaped half-cells according to Comparative Examples 1 to 13. Accordingly, the rechargeable lithium battery cells according to embodiments of the present disclosure may secure excellent capacity and resistance characteristics.

Experimental Example 3: Electrochemistry Impedance Spectroscopy (EIS)

Figure 2:
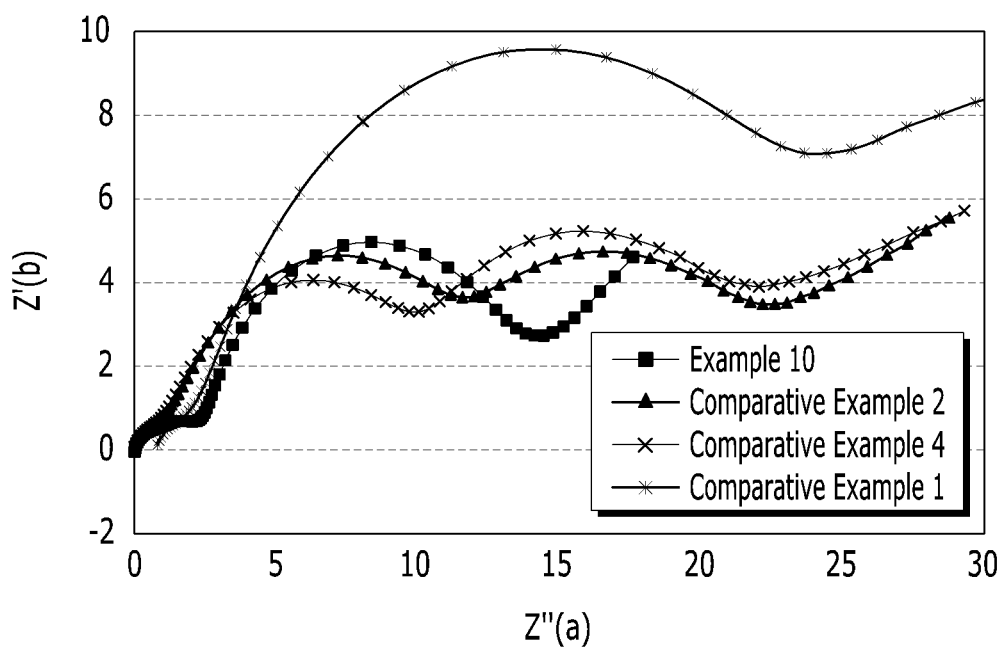
FIG. 2 is a graph showing electrochemical impedance spectroscopy (EIS) results of the rechargeable lithium battery cells according to Example 10 and Comparative Examples 1, 2, and 4.

Impedance of the coin-shaped half-cells according to Example 10 and Comparative Examples 1, 3 and 4 was measured under the following conditions, and the results are shown in FIG. 2.
Charge: CC-CV 0.2 C 4.5 V charge (0.05 C cut-off)
Amplitude: 100 K to 10 m (100000 to 0.01 Hz)
Shifted voltage phase: 10 mV (based on real transformed voltage phase)
The impedance was measured by using PARSTAT 2273 according to a 2-probe method, and in FIG. 2, Z' denotes resistance, and Z" denotes reactance.

Referring to FIG. 2, the coin-shaped half-cells according to Comparative Example 1 using a positive active material not including Zr or Ti, Comparative Example 2 using a positive active material only including Ti, and Comparative Example 4 using only including Zr showed much increased impedance, for example, much increased entire resistance.

On the contrary, the coin-shaped half-cell including Zr and Ti respectively in a set mol % range according to Example 10 showed a remarkably low entire resistance as compared with the cells according to Comparative Examples.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the subject matter of the present disclosure has been described in connection with what is presently considered to be practical embodiments, it is to be understood that the present disclosure is not limited to the disclosed embodiments, but, on the contrary, is intended to cover various modifications and equivalent arrangements included within the spirit and scope of the appended claims, and equivalents thereof.

DESCRIPTION OF SOME OF THE SYMBOLS

100: rechargeable lithium battery
11: positive electrode
12: negative electrode
13: separator
20: exterior material

What is claimed is:

1. A positive active material for a rechargeable lithium battery, the positive active material comprising:
a core having a layered structure; and
a surface layer on at least one portion of the surface of the core and comprising an oxide,
wherein the oxide comprises at least one first element and at least one second element each selected from the group consisting of Ti and Zr, the first element and the second element being different from one another,
wherein the first element is included in the positive active material in an amount of about 0.025 mol % to about 0.2 mol % based on a total weight of the positive active material,
wherein the second element is included in the positive active material in an amount of about 0.02 mol % to about 0.5 mol % based on a total weight of the positive active material, and
wherein a ratio of the mol % of the second element relative to the mol % of the first element is about 2 to about 10.

2. The positive active material of claim 1, wherein the first element comprises Zr and the second element comprises Ti.

3. The positive active material of claim 1, wherein the oxide further comprises at least one third element selected from the group consisting of Ti, Zr, F, Mg, Al, P, and a combination thereof.

4. The positive active material of claim 3, wherein the third element comprises Mg.

5. The positive active material of claim 1, wherein the core having the layered structure is represented by Chemical Formula 1:

$$Li_{1+x1}Co_{1-x2-x3}M1_{x2}M2_{x3}O_2 \quad \text{[Chemical Formula 1]}$$

wherein
$0<x1<0.05$, $0.005 \leq x2 \leq 0.02$, $0.005 \leq x3 \leq 0.025$,
M1 is selected from Mg, Al, Co, Ni, K, Na, Ca, Si, Fe, Cu, Zn, Ti, Sn, V, Ge, Ga, B, P, Se, Bi, As, Zr, Mn, Cr, Ge, Sr, V, Sc, Y, and a combination thereof,
M2 is selected from Al, Mg, Co, Ni, K, Na, Ca, Si, Fe, Cu, Zn, Ti, Sn, V, Ge, Ga, B, P, Se, Bi, As, Zr, Mn, Cr, Ge, Sr, V, Sc, Y, and a combination thereof, and
M1 and M2 are different from one another.

6. The positive active material of claim 5, wherein in Chemical Formula 1, x2 and x3 satisfy the range of Formula 2:

$$0.02 \leq x2+x3 \leq 0.03. \quad \text{[Formula 2]}$$

7. The positive active material of claim 5, wherein in Chemical Formula 1, x2 and x3 satisfy the range of Formula 3:

$$0.3 \leq x2/x3 \leq 1.0. \quad \text{[Formula 3]}$$

8. The positive active material of claim 5, wherein in Chemical Formula 1, M1 comprises Mg and M2 comprises Al.

9. The positive active material of claim 5, wherein the compound represented by Chemical Formula 1 comprises at least one selected from the group consisting of $Li_{1.025}Co_{0.9773}Mg_{0.01}Al_{0.0127}O_2$, $Li_{1.02}Co_{0.9773}Mg_{0.01}Al_{0.0127}O_2$, and $Li_{1.03}Co_{0.9773}Mg_{0.01}Al_{0.0127}O_2$.

10. A rechargeable lithium battery, comprising:
a positive electrode;
a negative electrode; and
an electrolyte solution,
wherein the positive electrode comprises the positive active material of claim 1.

11. The rechargeable lithium battery of claim 10, wherein the rechargeable lithium battery has a upper limit of working voltage of about 4.3 V to about 4.6 V.

* * * * *